United States Patent
Yano

Patent Number: 5,907,311
Date of Patent: May 25, 1999

[54] ELECTRODE STRUCTURE FOR PLASMA CHAMBER OF PLASMA ADDRESSED DISPLAY DEVICE

[75] Inventor: Tomoya Yano, Kanagawa, Japan

[73] Assignee: Sony Corporation, Tokyo, Japan

[21] Appl. No.: 08/493,765

[22] Filed: Jun. 22, 1995

[30] Foreign Application Priority Data

Jun. 24, 1994 [JP] Japan .................................. 6-443202

[51] Int. Cl.⁶ ............................. G11C 11/22; C02F 1/133
[52] U.S. Cl. ................................ 345/4; 345/66; 345/67; 345/71; 313/585; 313/1; 349/32
[58] Field of Search .................................. 345/42, 4, 41, 345/60, 62, 66, 214–215, 67; 313/518, 582, 1, 585; 315/326; 428/337; 359/54; 216/41; 395/183.13; 349/32

[56] References Cited

U.S. PATENT DOCUMENTS

| | | |
|---|---|---|
| 3,755,027 | 8/1973 | Gilsing . |
| 3,839,657 | 10/1974 | Nakayama et al. ...................... 345/41 |
| 3,894,264 | 7/1975 | Andoh et al. . |
| 4,048,533 | 9/1977 | Hinson et al. . |
| 4,121,133 | 10/1978 | Ernsthausen .......................... 313/518 |
| 4,896,149 | 1/1990 | Buzak . |
| 5,077,553 | 12/1991 | Buzak . |
| 5,107,182 | 4/1992 | Sano et al. . |
| 5,164,633 | 11/1992 | Kim et al. . |
| 5,182,489 | 1/1993 | Sano . |
| 5,276,384 | 1/1994 | Martin .................................... 313/582 |
| 5,313,223 | 5/1994 | Buzak et al. ............................ 345/60 |
| 5,349,454 | 9/1994 | Iwama . |
| 5,385,631 | 1/1995 | Tamemasa et al. ..................... 216/41 |
| 5,444,335 | 8/1995 | Matsumoto et al. .................... 315/326 |
| 5,499,122 | 3/1996 | Yano ........................................ 359/54 |
| 5,518,808 | 5/1996 | Bruno et al. ............................ 428/337 |
| 5,525,862 | 6/1996 | Miyazaki ................................. 345/60 |
| 5,561,764 | 10/1996 | Ninomiya ........................... 395/183.13 |
| 5,570,104 | 10/1996 | Hayashi .................................. 345/60 |

FOREIGN PATENT DOCUMENTS

| | | |
|---|---|---|
| A 0 545 569 A1 | 9/1993 | European Pat. Off. . |
| A 0 567 020 A1 | 10/1993 | European Pat. Off. . |

*Primary Examiner*—Mark R. Powell
*Attorney, Agent, or Firm*—Hill, Steadman & Simpson

[57] ABSTRACT

A liquid crystal cell and a plasma cell are layered together with a dielectric sheet in between. Data electrodes (column electrodes) are constructed to form parallel columns on the underside of an upper substrate in a display cell. Discharge channels filled with ionizable gas are constructed in parallel rows in a plasma cell. Row electrodes are constructed on the upperside of a lower substrate corresponding to each of the discharge channels, and reference electrodes to which reference voltages are applied, are constructed inside each of the discharge channels. Data voltages are applied to the data electrodes and drive pulses are applied to the row electrodes. The polarities of the data voltages are changed so as to be opposite to the polarities of the drive pulses with respect to the reference voltages. Each time the polarities of the drive pulses are inverted, plasma discharges are generated in the discharge channel corresponding to the row electrodes to which the drive pulses are applied.

21 Claims, 11 Drawing Sheets

ELECTRODE STRUCTURE FOR PLASMA CHAMBER OF PLASMA ADDRESSED DISPLAY DEVICE

FIELD OF THE INVENTION

The present invention relates to a plasma addressed display device in which an electro-optical display cell, which contains an electro-optical material layer, is layered together with a plasma cell, with a dielectric sheet positioned between such display cell and plasma cell.

BACKGROUND OF THE INVENTION

Figure 1:
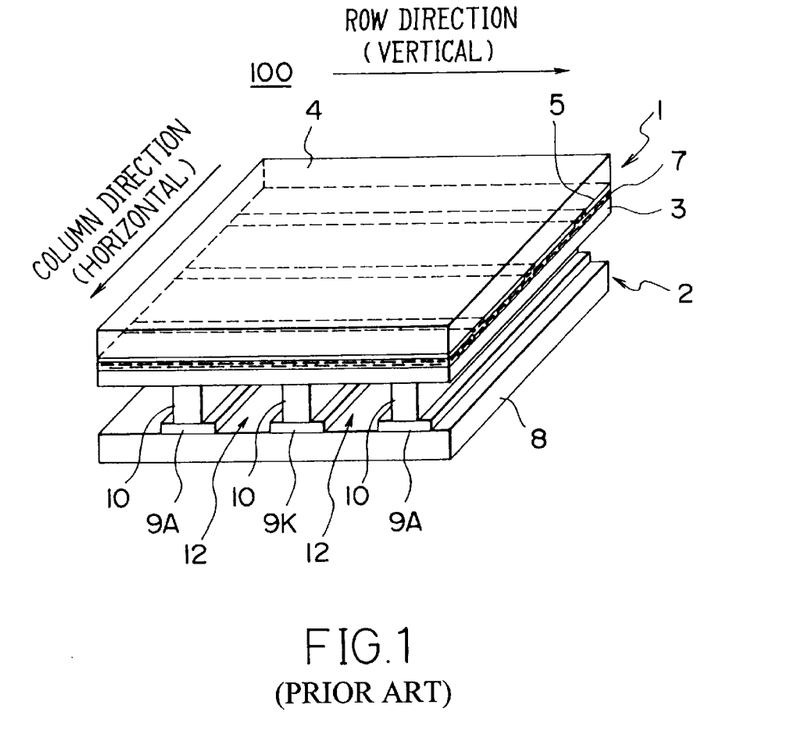
FIG. 1 illustrates a perspective view of a construction of a plasma addressed display device from the prior art.
Figure 2:
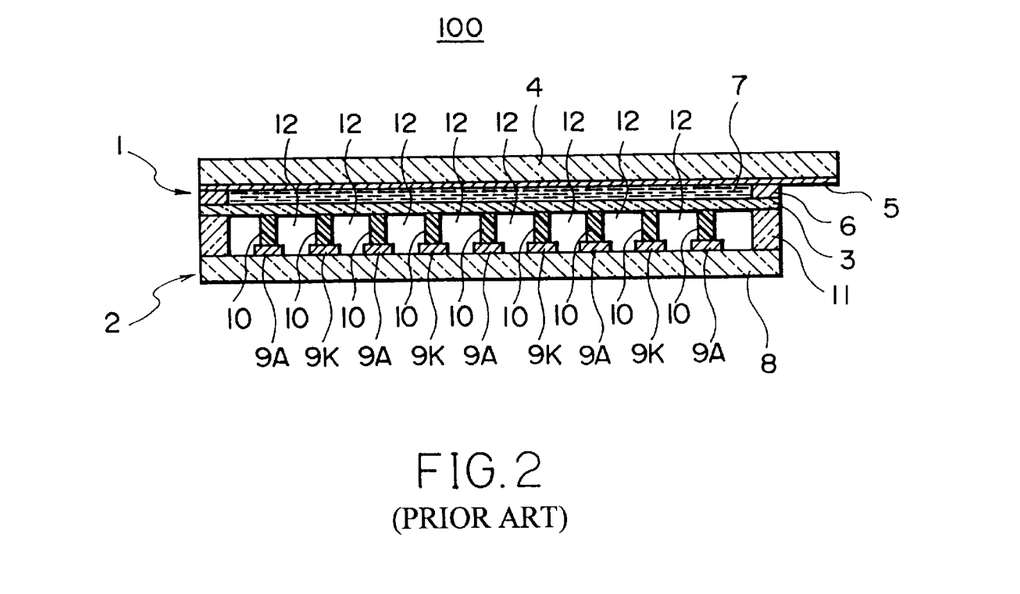
FIG. 2 illustrates a cross-sectional view of the construction of the plasma address display device from the prior art.

A plasma addressed display device in which a plasma cell and the electro-optical display cell are layered together with a dielectric sheet in between, has been previously disclosed in U.S. Pat. No. 4,896,149 to Buzak (Issue date: Jan. 23,1990), U.S. Pat. No. 5,077,553 to Buzak (Issue date: Dec. 31, 1991), and U.S. Pat. application Ser. No. 07/837,961 for an Electro Optical Device, filed by Shigeki Miyazaki on Feb. 20, 1992. The disclosure of the three above noted references are hereby incorporated herein. FIG. 1 and FIG. 2 illustrate a construction of such plasma addressed display device 100.

In FIG. 1 and FIG. 2, the plasma addressed display device 100 is constructed of a flat panel in which the electro-optical display cell 1 and the plasma cell 2 are layered together with the dielectric sheet 3 positioned between them. The dielectric sheet 3 is made up of laminate glass and/or other materials. In order to allow the display cell 1 to be driven, it is preferable for such dielectric sheet 3 to be formed as-thickly as possible, for example, a thickness of 50 μm.

The display cell 1 is comprised of an upper glass substrate (upper substrate) 4. Inside the upper substrate 4, a number of data electrodes 5 made of transparent conductive material are positioned in such a way as to form parallel vertical rows. The upper substrate 4 is separated from the dielectric sheet 3 at a predetermined distance by spacers 6. The space between the upper substrate 4 and the dielectric sheet 3 is filled with liquid crystal, which forms a liquid crystal layer 7.

The plasma cell 2 incorporates a lower glass substrate (lower substrate) 8. Inside the lower substrate 8, a number of anode electrodes 9A and cathode electrodes 9K, which constitute plasma electrodes, are alternately positioned in parallel columns. Each electrodes 9A and 9K has a barrier rib 10 on its upper side. The tops of each of the barrier ribs 10 are in contact with the underside of the dielectric sheet 3.

A frit seal portion 11 is located on the circumference of the lower substrate 8 and attaches the lower substrate 8 to the dielectric sheet 3 in an air-tight fashion. The space between the lower substrate 8 and the dielectric sheet 3 is filled with an ionizable gas.

Figure 3:
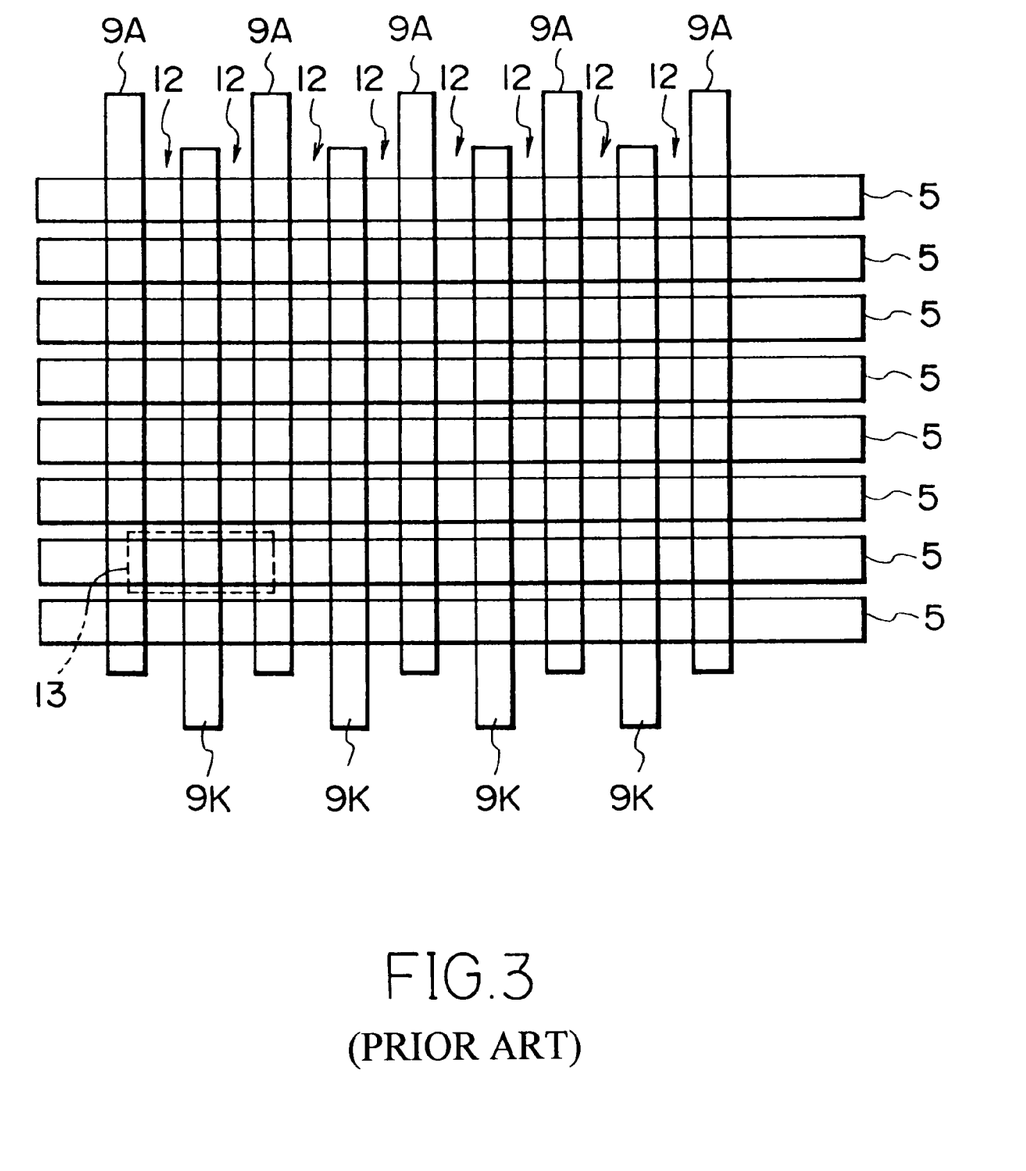
FIG. 3 illustrates an arrangement of the data electrodes, the plasma electrodes, and the discharge channels.

The spaces between the lower substrate 8 and the dielectric sheet 3 form discharge channels 12 which run in parallel rows to each other and which form right angles with the data electrodes 5. Pixels 13 are provided where the discharge channels 12 intersect with the data electrodes 5 as shown in FIG. 3.

In such construction, when a predetermined voltage is applied between the anode electrodes 9A and the cathode electrode 9K corresponding to a specified pair of discharge channels 12, the gas in the pair of the discharge channel 12 is ionized, generating a plasma discharge, at which point the discharge channel 12 is held at anode electric potential. In this situation, when a write data voltage is applied to the data electrode 5, the write data voltage is written through the dielectric sheet 3 onto the liquid crystal layer 7 for each of the pixels 13, which pixels are arranged along a column corresponding to the pair of the discharge channels 12. When the plasma discharge is completed, the discharge channel 12 changes to a floating electric potential, and the liquid crystal layer 7 for each pixel 13 holds the written data voltage until the next writing period (for example, one field later or one frame later). In such process, the discharge channel 12 acts as a sampling switch, and the liquid crystal layer 7 of each of the pixels 13 acts as a sampling capacitor.

A display is produced on a pixel basis from the action of the liquid crystal due to the data voltage which is written onto the liquid crystal layer 7 for each of the pixels 13. Accordingly, a two-dimensional image can be displayed by scanning successively along a row of a pair of the discharge channels 12 in which the plasma discharge is generated, writing a write data voltage onto the liquid crystal layer 7 for the pixels 13 arranged along a column.

Figure 4:
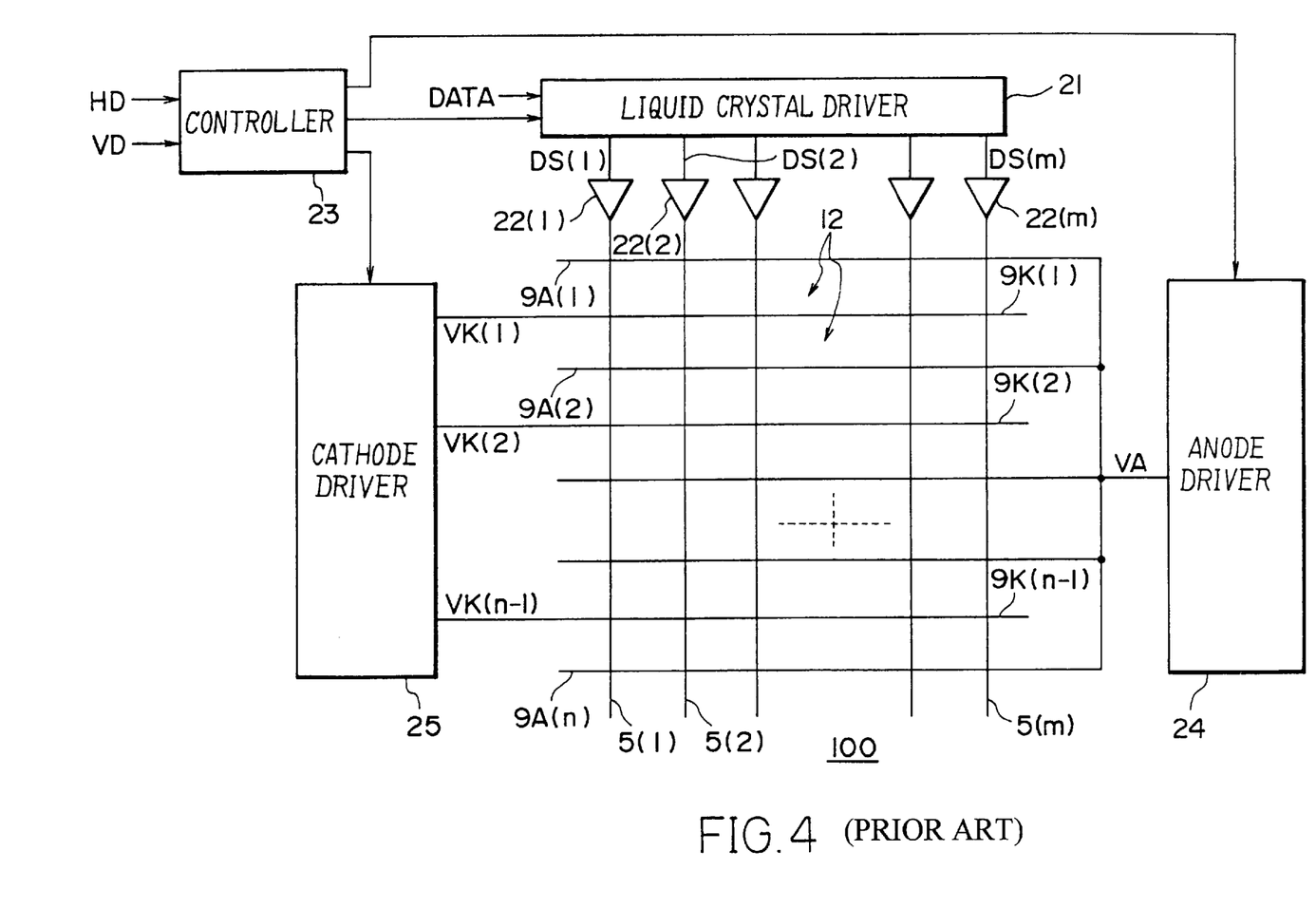
FIG. 4 illustrates a circuitry construction of the plasma addressed display device from the prior art.

FIG. 4 illustrates in a block diagram form a construction of the plasma addressed display device 100 described above. In FIG. 4, the same reference numbers have been employed to designate like portions in FIG. 1 and FIG. 2. Reference numeral 21 denotes a liquid crystal driver, which receives video data "DATA". The liquid crystal driver 21 simultaneously outputs the data voltages DS(1) to DS(m) for pixels which form a line during each horizontal period. These data voltages DS(1) to DS(m) for pixels are supplied via buffers 22(1) to 22(m), respectively, to the data electrodes 5(1) to 5(m), respectively.

The operation of the liquid crystal driver 21 is controlled by a controller 23. A horizontal synchronizing signal HD and a vertical synchronizing signal VD are supplied as synchronizing reference signals to the controller 23. This controller 23 also controls the operations of an anode driver 24 and a cathode driver 25 described below.

Reference numeral 24 denotes the anode driver, which supplies an anode voltage VA as a reference voltage to anode electrodes 9A(l) to 9A(n) which are all connected to the anode driver 24. Reference numeral 25 denotes the cathode driver, which during each horizontal period successively supplies cathode voltages VK(1) to VK(n−1) which are equal to voltage differences between an anode electric potential and a predetermined electric potential, to cathode electrodes 9K(1) to 9K(n−1). This process allows the plasma discharge to be generated during each horizontal period successively in each pair of the discharge channels 12 corresponding to each of the cathode electrodes 9K(1) to 9K(n−1), so that the pairs of discharge channels 12 for writing data voltages DS(1) to DS(m) onto the liquid crystal layers 7 for the pixels arranged in horizontal columns, are scanned successively along a vertical row.

Figure 5A:
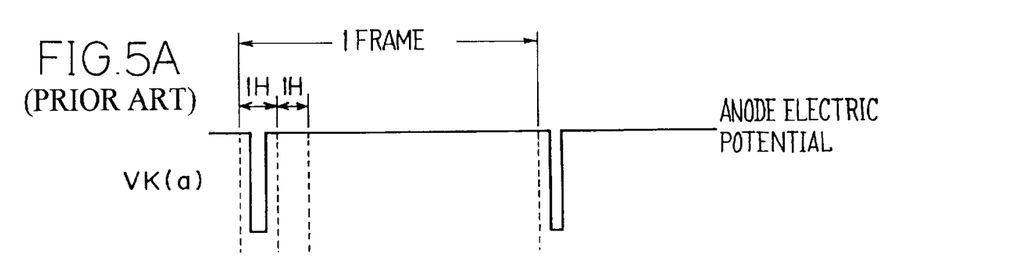
FIGS. 5A–5E constitute a wave form chart illustrating changing of cathode voltages and data voltages in the prior art.
Figure 5B:
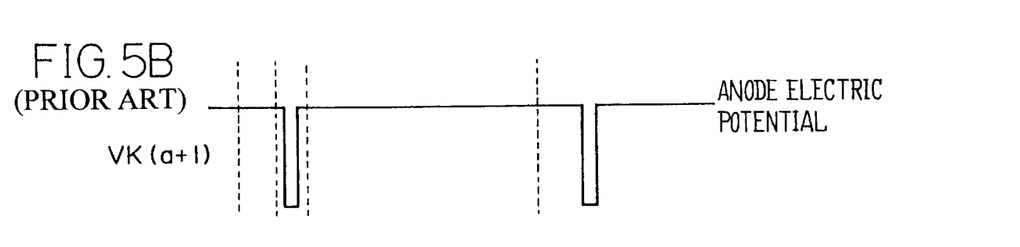
Figure 5C:
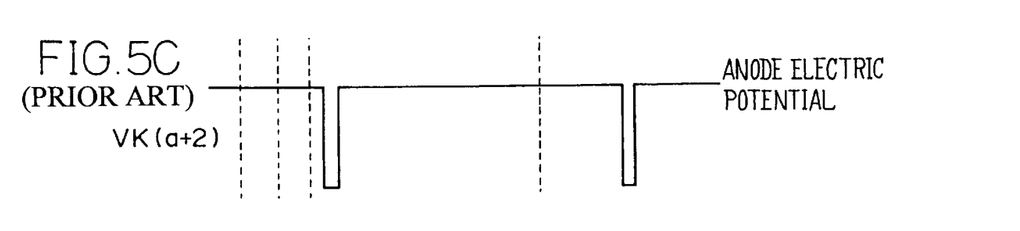
Figure 5D:
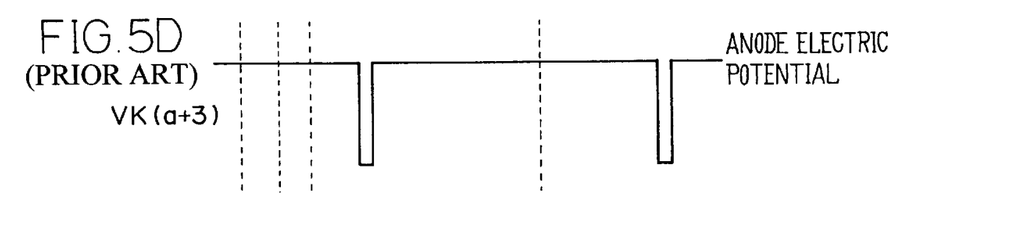
Figure 5E:
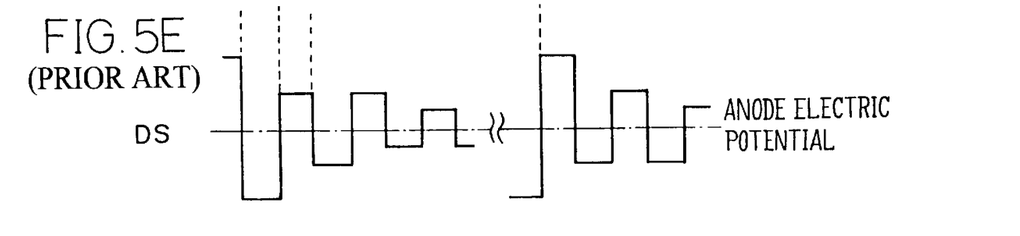

The cathode voltage to be applied to the cathode electrode 9K and the data voltage DS to be applied to the data electrode 5 are, respectively, described below. FIGS. 5A to 5D are the cathode voltages VK(a) to VK(a+3) to be applied to the serial cathode electrodes 9K(a) to 9K(a+3), respectively, and FIG. 5E is the data voltage DS to be applied to the specified data electrode 5. The cathode voltages VK(a) to VK(a+3), which are equal to the voltage differences between the anode electric potential and the predetermined electric potential, are applied during each horizontal period (1H) for each frame to the cathode electrodes 9K(a) to 9K(a+3), respectively. Thus, the discharge channels 12 in which the plasma discharge is generated, are successively scanned along the vertical row. In addition, during each horizontal period and for each frame the data voltage DS is inverted in polarity in accordance with the anode electric potential, so that the liquid crystal layer 7 is driven by an alternating current.

In the plasma addressed display device 100 described above, the lower face of the dielectric sheet 3 (the side of the plasma cell 2) is charged by ions and electrons generated by the plasma discharge (which is a DC discharge), causing the data voltage DS to be written onto the dielectric sheet 3. In a device which writes the data by DC discharge such as this, it is difficult in principle to make the discharge current density uniform throughout the discharge channel and to provide a stable display image on the whole screen, because of the condition of the surface of the plasma electrodes (the anode electrode 9A and the cathode electrode 9K), drops in voltage caused by the discharge current, dispersion in the construction, and the electric potential of the data electrode.

For example, because the area where the discharge is generated is easily discharged by a positive feedback due to the DC discharge, the discharge is dispersed. Moreover it is difficult to generate the discharge in places because of a drop in voltage from the discharge flow. When the data voltage DS is equal in polarity to the cathode voltage and the anode electric potential (which is the reference electric potential) which are used as discharge drive voltages, the electric field in the discharge channel 12 is weakened, and such weakness inhibits generation of the discharge.

Further, the anode electrode 9A or the cathode electrode 9K may be disconnected due, to sputtering of the ions and the electrons generated by the plasma discharge because the electrodes are not covered with dielectric material. Also, the degree of transmission may be adversely affected by metal fragments scattered by such sputtering. Additionally, since a discharge luminescence caused by the DC discharge is maintained, the contrast for the display is lost somewhat due to the brightness of the screen.

SUMMARY OF THE INVENTION

An object of the invention is to provide an improved plasma addressed display device which can prevent the plasma electrodes from being disconnected from one another due to electrode sputtering and prevent transmittance through the display from being adversely affected by scattered metal.

A further object is to provide an improved plasma addressed display device which can prevent the contrast from being reduced due to discharge luminescence.

A still further object is to provide an improved plasma addressed display device which can be driven by a low discharge drive voltage.

In one aspect of the present invention, a plasma addressed display device is comprised of a display cell, a plasma cell, dielectric sheet, a driving circuit, and a plasma discharge generating means.

The display cell has an electro-optical material layer, and a number of non-overlapping first electrodes positioned vertically parallel to each other on one side of the electro-optical material layer. The plasma cell is provided on the other side of the electro-optical material layer and has a number of non-overlapping discharge channels. Each discharge channel includes reference electrodes and second electrodes positioned horizontally parallel to each other. The dielectric sheet is provided between the display cell and the plasma cell. The driving circuit applies a data voltage to the first electrodes. The plasma discharge generating means generates plasma discharge between the first and second electrodes in order to apply the data voltages to the electro-optical material layer through the dielectric sheet.

In such construction, the data voltage is written by the plasma discharge (which is an AC discharge), which is completed when the charge-up is completed. This prevents the discharge from being dispersed and eliminates difficulties in generating a discharge in certain areas because of a drop in voltage from the discharge current. Accordingly, it is easy to obtain a uniform discharge current density equal throughout the entire discharge channel and possible to obtain a stable display image throughout the whole screen. Further, since the discharge is not continued, it is possible to prevent a reduction of contrast due to the discharge luminescence.

In another aspect of the present invention, in the plasma addressed display device, the polarities of the data voltages applied to the first electrodes are the opposite of the polarities of the drive pulses applied to the second electrodes with respect to an electric potential of the reference electrodes.

Accordingly, the discharge is not inhibited by the data voltage and the device can be driven with a low drive pulse voltage.

In still another aspect of the present invention, in the plasma addressed display device, a protection layer is formed on the face of the dielectric sheet on the discharge channel side at least in those areas where the plasma discharge is generated.

Accordingly, this prevents the discharge generating voltage from rising due to the deterioration of the dielectric sheet through time caused by the plasma discharge and it is possible to lower the discharge generating voltage.

In still further aspect of the present invention, the transparent dielectric layer is constructed in order to cover at least the surfaces of the second electrodes, thereby protecting the second electrodes from sputtering by the ions and the electrons generated by the plasma discharge thereby making it possible to control disconnection of the electrodes from each other. In addition, the metal of the electrodes does not fly apart even when sputtering occurs and it is thus possible to prevent the reduction of transmittance.

In still a further aspect of the present invention, in the plasma addressed display device, a second protection layer is constructed in order to cover a surface of the dielectric layer on the discharge channel side at least in those areas where the plasma discharge is generated. Accordingly, this prevents the voltage required for discharge generation from rising due to the deterioration of the dielectric sheet through time which is caused by the plasma discharge and makes it possible to lower the discharge generating voltage.

Additional objects and advantages of the present invention will be apparent from the following detailed description of a preferred embodiment thereof, which is best understood with reference to the accompanying drawings.

DETAILED DESCRIPTION OF THE INVENTION

Figure 6:
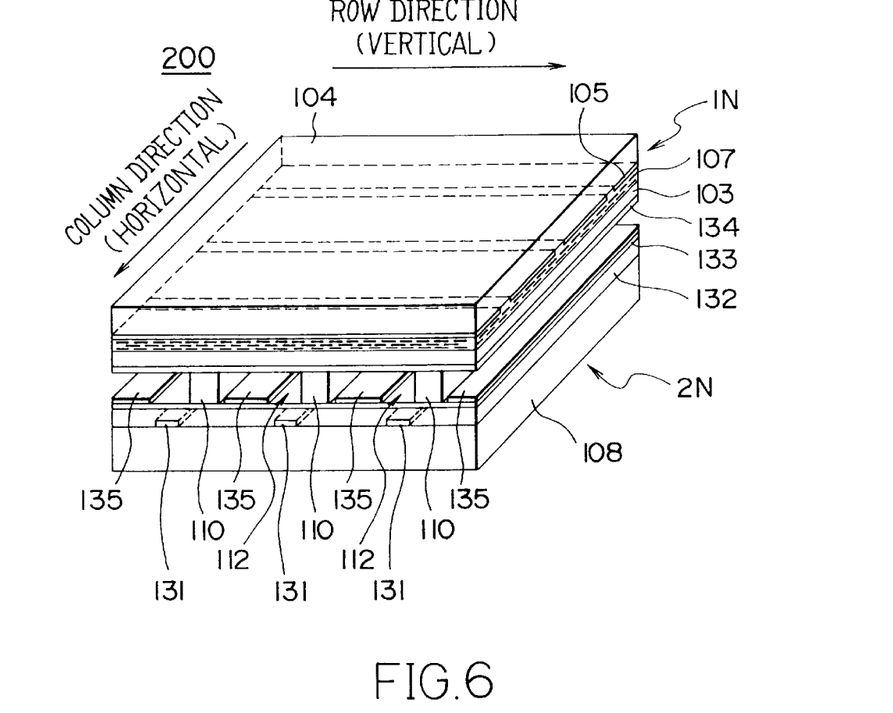
FIG. 6 illustrates a perspective view of an embodiment of a plasma addressed display device according to the present invention.
Figure 7:
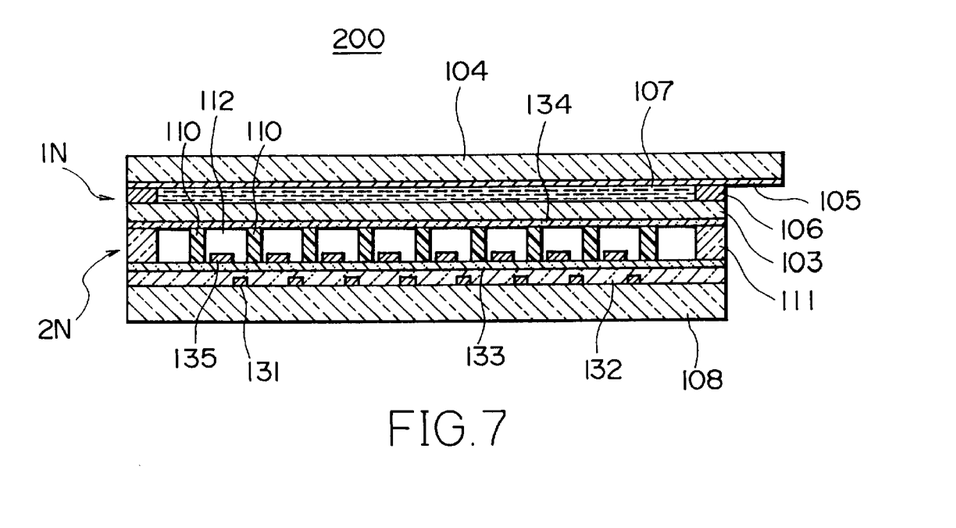
FIG. 7 illustrates a cross-sectional view of the plasma addressed display device according to the present invention.

A preferred embodiment according to the present invention is described below with reference to the drawings. FIG. 6 and FIG. 7 illustrate a construction of the plasma addressed display device 200 according to the present invention.

The plasma addressed display device 200 is constructed of a flat panel in which the electro-optical display cell 1N and the plasma cell 2N are layered together with the dielectric sheet 103 positioned between them. The dielectric sheet 103 is made up of laminate glass and other materials. In order to allow the display cell 1N to be driven, it is preferrable for such dielectric sheet 103 to be formed as thickly as possible, for example, a thickness of 50 μm.

The display cell IN is comprised of an upper glass substrate (upper substrate) 104. Inside the upper substrate 104, a number of data electrodes 105 made of transparent conductive material are positioned in such a way as to form parallel vertical columns at predetermined intervals. The upper substrate 104 is separated from the dielectric sheet 103 at a predetermined distance by spacers 106. The space between the upper substrate 104 and the dielectric sheet 103 is filled with electro-optical material, liquid crystal, which forms a liquid crystal layer 107. The distance between the upper substrate 104 and the dielectric sheet 103 is, for example, 4 to 10 μm, and such distance is maintained equally over the display face. Material other than liquid crystal may also be used as electro-optical material.

A plasma cell 2N is comprised of a lower substrate 108. row electrodes 131 form parallel rows inside the lower substrate 108 so as to correspond to the discharge channels 112 described below. A transparent dielectric layer 132 made of SiO2 and/or other materials is formed inside the lower substrate 108 on its main face so as to cover the row electrodes 131, and a transparent protection layer 133 made of MgO and/or other materials is formed on this dielectric layer 132. Further, a transparent protection layer 134 made of MgO or other materials is formed on the plasma cell 2N side of the dielectric sheet 103.

A plurality of barrier ribs 110 form parallel rows on the protection layer 133 covering the lower substrate 108. The tops of each of the barrier ribs 110 are in contact with the underside of the protection layer 134, and this separates the protection layer 133 from the protection layer 134 by a specified distance. A frit seal portion 111 made of glass with a low melting point is located on the circumference of the lower substrate 108 and attaches the lower substrate 108 with the dielectric sheet 103 in an air-tight fashion. The space between the protection layer 133 and the protection layer 134 is filled with an ionizable gas such as helium, neon, or argon, or with a mixture of such gases.

The spaces between the protection layer 133 and the protection layer 134 form discharge channels (spaces) 112 which are separated by the barrier ribs 110 and which are positioned in parallel columns. As described above, each row electrode 131 is positioned so as to correspond to each of the discharge channels 112. In each discharge channel 112 on the protection layer 133, a reference electrode (transparent electrode) 135 extends along such discharge channel 112.

Figure 8:
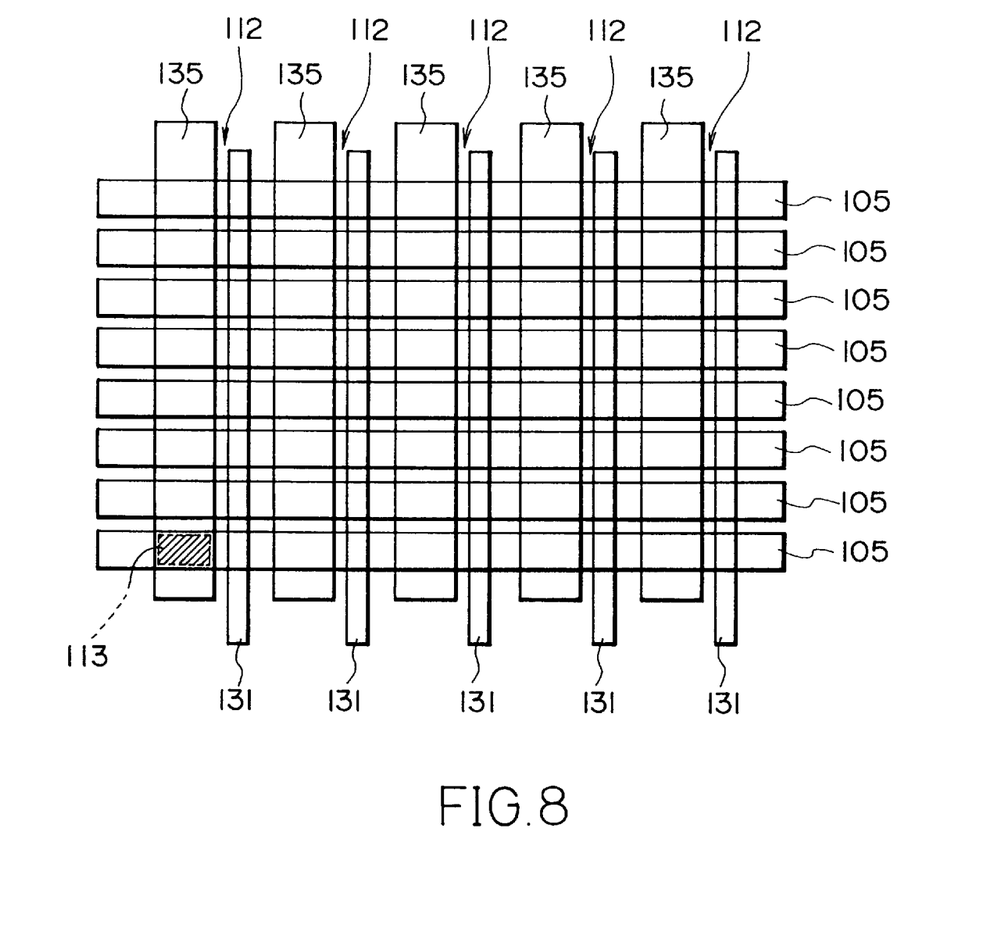
FIG. 8 illustrates an arrangement of data electrodes (column electrodes), row electrodes, and reference electrodes according to the present invention.

The discharge channels 112 form right angles with the data electrodes (column electrodes) 105. Each of the data electrodes 105 acts as a column driving unit, while each of the discharge channels 112 acts as a row driving unit. Pixels 113 are provided where the discharge channels 112 intersect with the data electrodes 105 as shown in FIG. 8.

Figure 9:
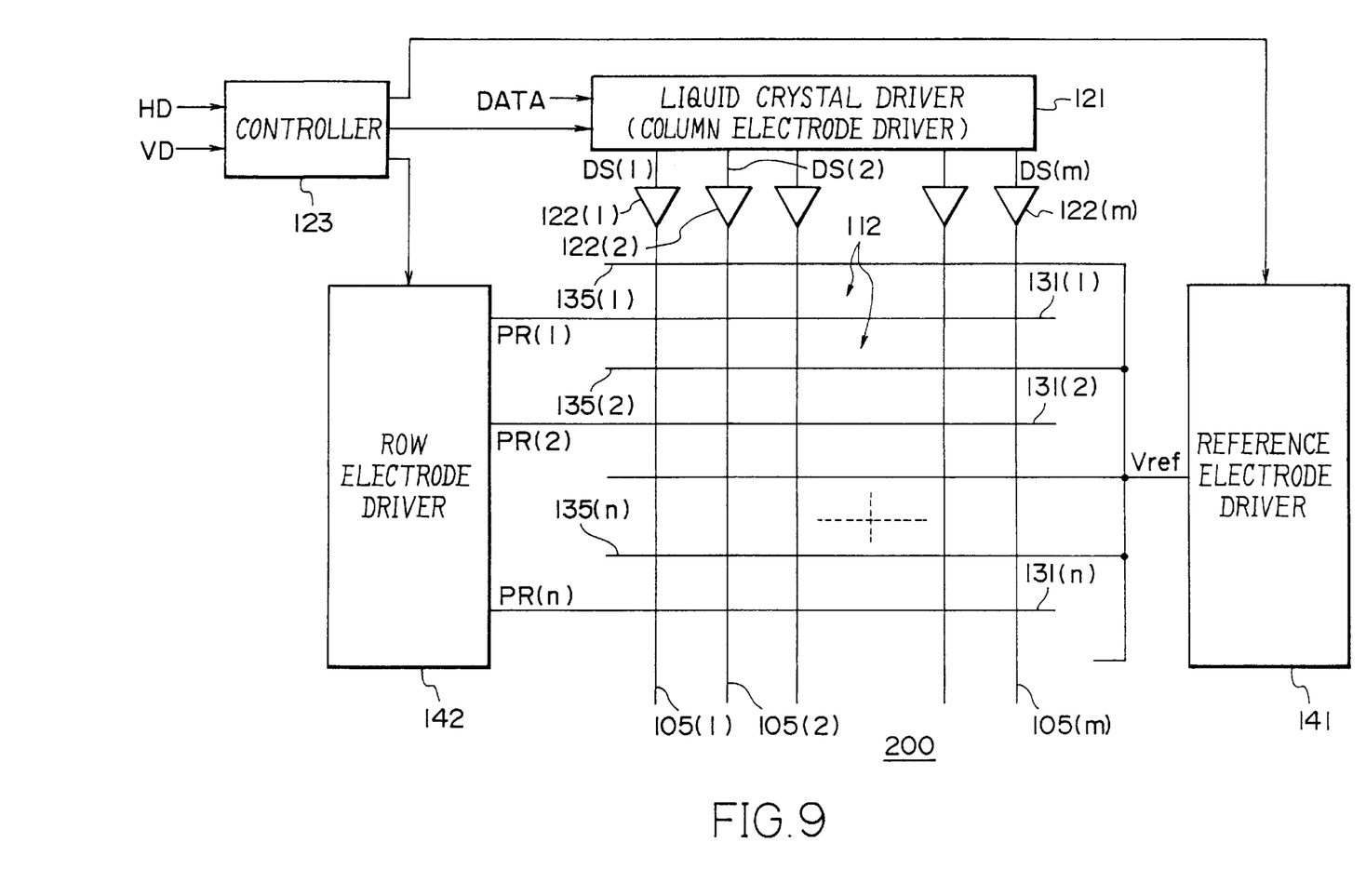
FIG. 9 illustrates a circuitry construction according to the present invention.

FIG. 9 illustrates a circuitry construction of the plasma addressed display device 200 described above. Reference numeral 121 denotes a liquid crystal driver (column electrode driver), which receives video data DATA. During each horizontal period, the liquid crystal driver 121 simultaneously outputs data voltages DS(1) to DS(m) for the pixels which constitute each line, and data voltages DS(1) to DS(m) for the pixels are applied via buffers 122(1) to 122(m), respectively, to the data electrodes 105(1) to 105(m), respectively.

The operation of the liquid crystal driver 121 is controlled by a controller 123. A horizontal synchronizing signal HD and a vertical synchronizing signal VD, which are synchronized with the video data DATA, are supplied as synchronizing reference signals to the controller 123. The controller 123 also controls operations of a reference electrode driver 141 and a row electrode driver 142 as described below.

Reference numeral 141 denotes a reference electrode driver. A reference voltage Vref is supplied from the reference electrode driver 141 to the reference electrodes 135(1) to 135(n) which are all connected to the reference electrode driver 141. Reference numeral 142 denotes a row electrode driver for providing drive pulses PR(l) to PR(n) to the row electrodes 131(1) to 131(n), respectively. The polarity of each of the drive pulses PR(1) to PR(n) is successively inverted with respect to the reference voltage Vref for each frame, and each drive pulse PR(1) to PR(n) is delayed successively for one horizontal period (1H).

The polarities of the data voltages DS(1) to DS(m) are inverted in each frame with respect to the reference voltage Vref. As is more fully described below, each time the polarities of the drive pulses PR(1) to PR(n), which are applied to the row electrodes 131(1) to 131(n), respectively, are changed, plasma discharges in the discharge channels 112 that correspond to each of the row electrodes 131(1) to 131(n) are generated and the data voltages DS(1) to DS(m) are written onto the liquid crystal layer 107 for pixels 113 which are arrayed in the horizontal rows. In this process, the polarities of inverted drive pulses PR(1) to PR(n) are set opposite to the polarities of the data voltages DS(1) to DS(m), respectively.

Figure 10A:
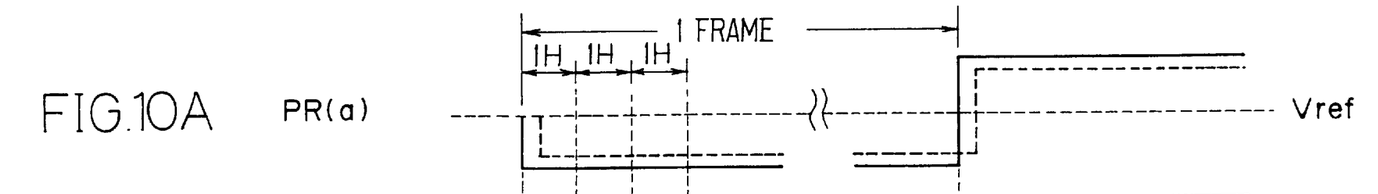
FIGS. 10A–10E illustrate the changing of drive pulses and data voltages.
Figure 10B:
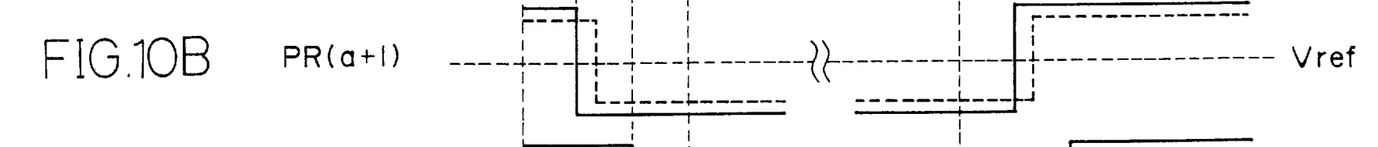
Figure 10C:
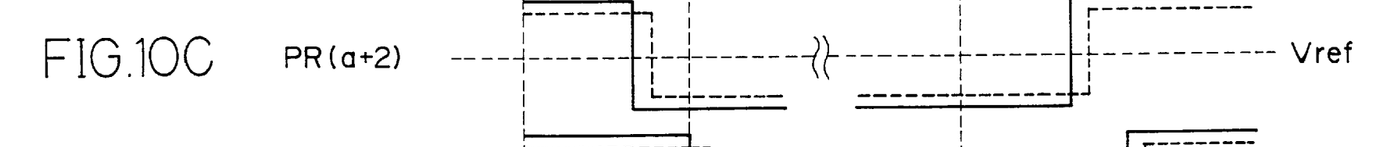
Figures 10D, 10E:
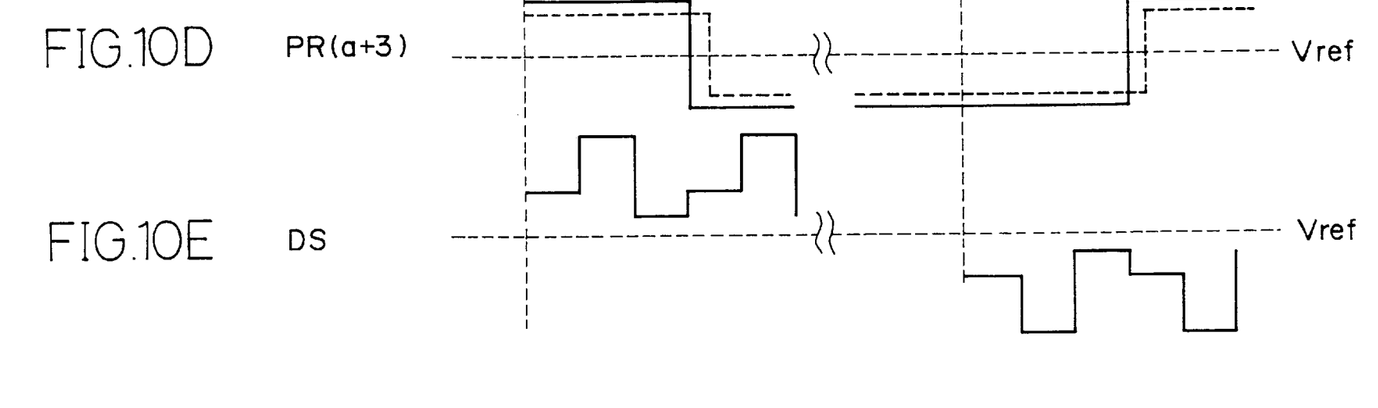

The solid lines shown in FIGS. 10A to 10D illustrate the drive pulses PR(a) to PR(a+3) which are applied to the serial row electrodes 131(a) to 131(a+3), and FIG. 10E illustrates the data voltage DS which is applied to the specified data electrode 105. Dashed lines shown in FIGS. 10A to 10D illustrate a summary of the changes of surface voltages, in other words, the "wall voltages", of the protection layers 133 which change in response to the changes in the drive pulses PR(a) to PR(a+3).

Figure 11:
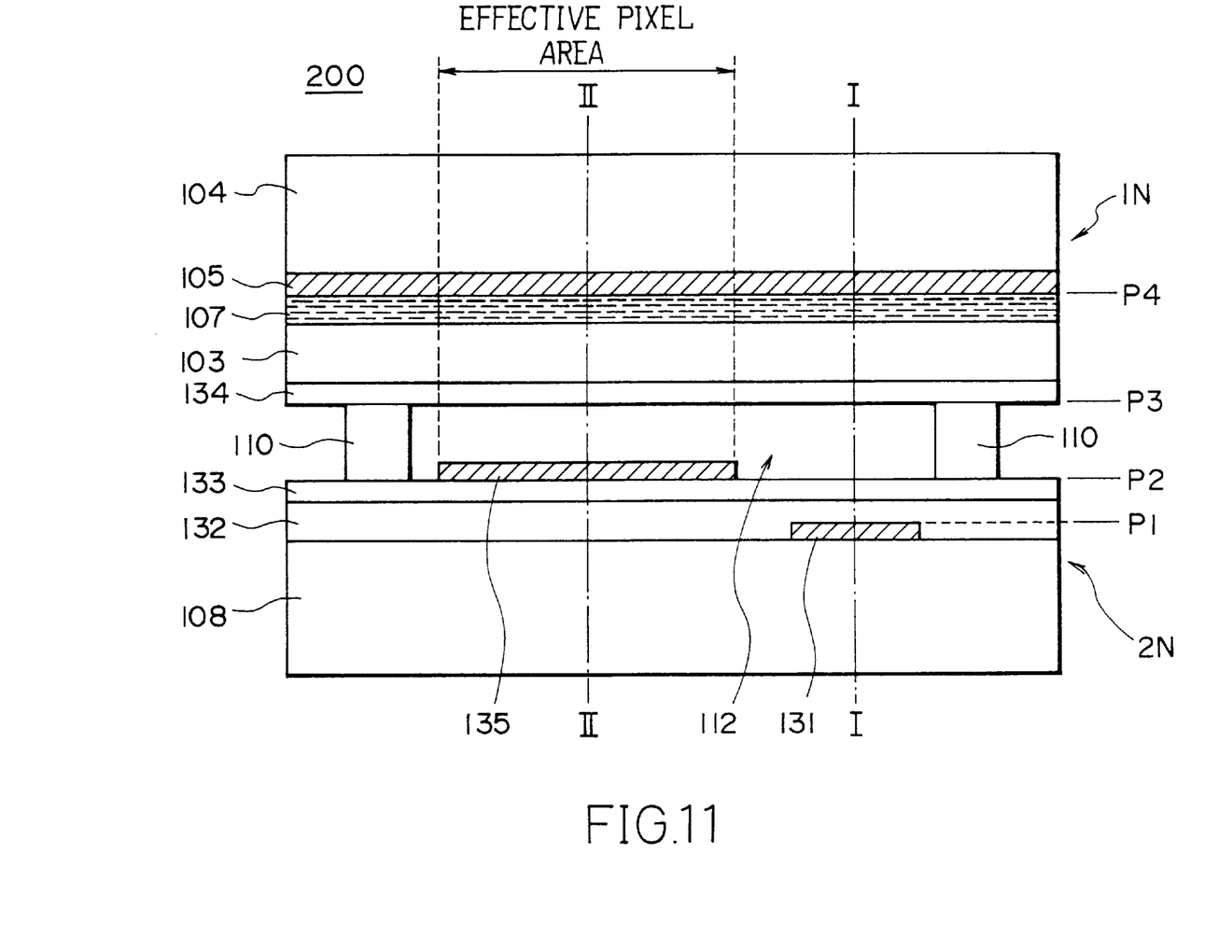
FIG. 11 illustrates, on an enlarged scale, a sectional view of one of the discharge channel in the embodiment.
Figure 12:
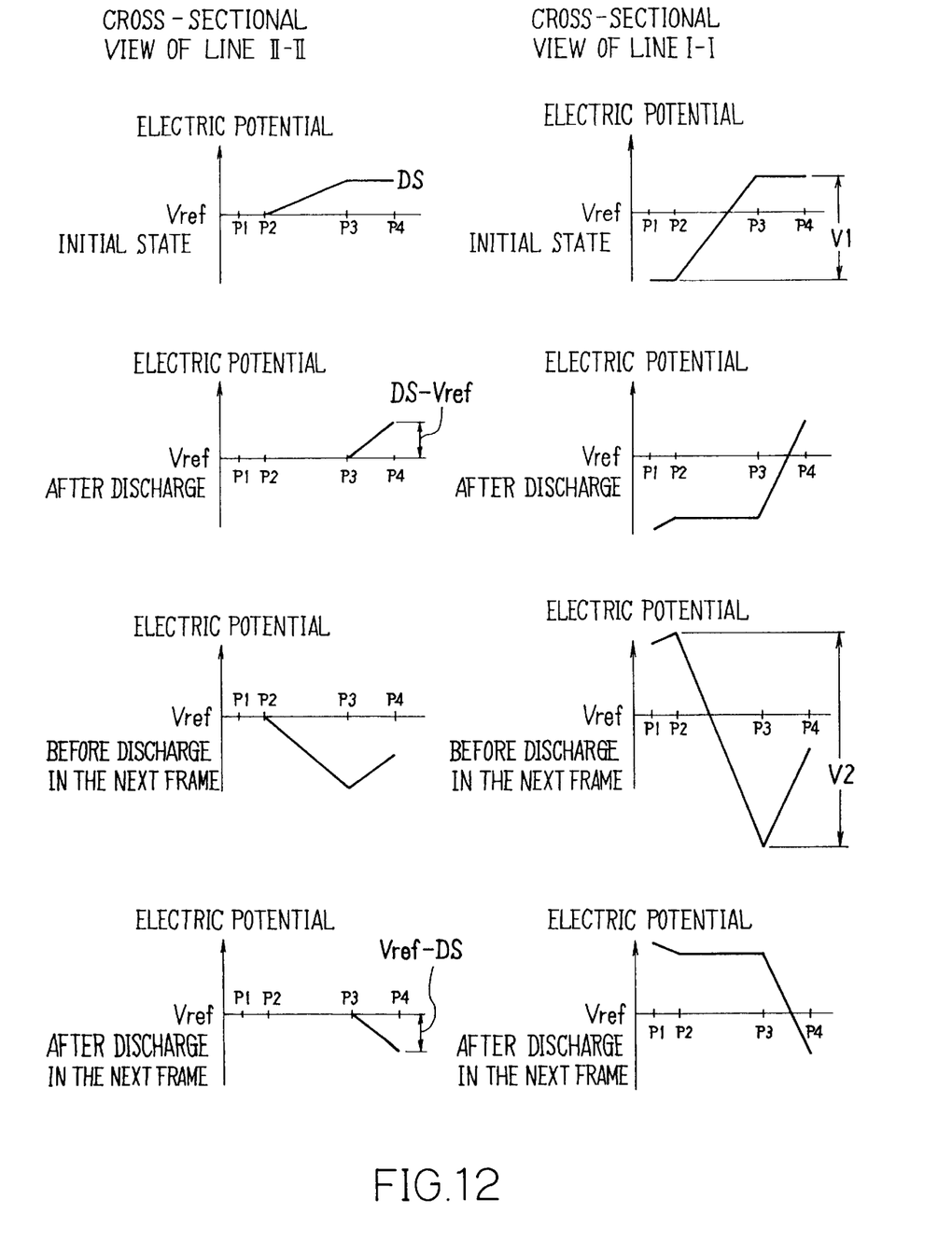
FIG. 12 illustrates the changing of electric potential states in cross-sectional views of lines I—I and II—II in FIG. 11.

FIG. 11 shows an enlargement of a portion of one of the discharge channels 112. FIG. 12 illustrates an initial state, the electric potential state after a plasma discharge, the electric potential state before the plasma discharge for the next frame, and the electric potential state after the plasma discharge for the next frame, relating to the cross-sectional views of lines I—I and II—II from FIG. 11. Here, reference character P1 denotes a position on the surface of the column electrode 131, reference character P2 denotes a position on the surface of the protection layer 133, reference character P3 denotes a position on the surface of the protection layer 134, and reference character P4 denotes a position on the surface of the data electrode (column electrode) 105.

In the initial state, the surfaces of the protection layers 133 and 134 are not charged. In the cross-sectional view of line I—I, the surface electric potential of the protection layer 133 is equal to the surface electric potential of the row electrode 131 and the surface electric potential of the protection layer 134 is equal to the surface electric potential of the data electrode (column electrode) 105.

In this state, when the electric potential difference between the protection layers 133 and 134 rises above a discharge generating voltage, a plasma discharge is generated. Ions and electrons generated by this plasma discharge reach the surface of the protection layers 133 and 134 through the electric field inside the discharge channel 112, and charge the surface of the protection layers 133 and 134 so as to destroy the electric field. At the point the electric potential difference between the protection layers 133 and 134 falls below the discharge maintenance voltage, the plasma discharge is automatically terminated. Although the surface of the protection layer 134 which is positioned above the reference electrode 135 is charged during the time the plasma discharge is being generated, the voltage charged at this position becomes equal to the electric potential difference (DS−Vref) between the data electrode 105 and the reference electrode 135. In other words, if the portion above the reference electrode 135, which is not influenced by the electric potential of the row electrode 131, is set at an effective pixel area, data voltage DS which was applied to the data electrode 105 is written onto this position and is maintained until the next frame.

In the next frame, when the polarity of the drive pulse applied to the row electrode 131 and the polarity of the data voltage DS applied to the data electrode 105 are inverted, the difference in the electric potentials between protection layers 133 and protection layer 134 is stacked to the "wall voltage", and thus, since it exceeds the discharge generating voltage, a plasma discharge is again generated. The ions and the electrons generated by this plasma discharge charge the surface of the protection layers 133 and 134 so as to destroy the electric field, as was described above. Then data voltage DS which was applied to the data electrode 105 is written onto the effective pixel area and is maintained until the next frame. Subsequently, each time the polarity of the drive pulse applied to the row electrode 131 and the polarity of the data voltage DS applied to the data electrode 105 are inverted, a plasma discharge is generated in a fashion similar to that described above, and the data voltage DS which was applied to the data electrode 105 is written onto the effective pixel area through the charging of the surface of the protection layers 133 and 134, and is maintained until the next frame.

Further, in the following frame, if the size of the data voltage DS remains the same when the polarity of the drive pulse which is applied to the row electrode 131 and the polarity of the data voltage DS applied to the data electrode 105 are inverted, on the electric potential difference V2 between the protection layers 133 and 134 becomes larger than that of the electric potential difference V1 of the initial state, due to the stacking of the "wall voltage". Accordingly, in the following frame, the voltage of the drive pulse voltage can be lowered, because even when the voltage of the drive pulse is lowered, the electric potential difference between the protection layers 133 and 134, will still exceed the discharge generating voltage.

With the structure described above, a plasma discharge (AC discharge) is generated in the discharge channels 112 corresponding to each of the row electrodes 131(1) to 131(n) each time the polarities of the drive pulses PR(1) to PR(n) which are supplied to the row electrodes 131(1) to 131(n) are changed and the data voltages DS(1) to DS(m) are written onto the liquid crystal layer 107 for the various pixels 113 which are arrayed in the direction of the row (vertically) and which correspond to the discharge channels 112 in which the plasma discharges were generated. In such case, since the polarity shift for each drive pulse PR(1) to PR(n) is delayed for one horizontal period, the discharges channels 112 in which the plasma discharge are generated are successively scanned along the directions of the rows for each horizontal period and the data voltages DS(1) to DS(m) are written onto the liquid crystal layer 107 for the various pixels 113 which are arrayed in the rows (vertically).

The data voltages written at each of the pixels 113 are maintained until the next write period, one frame later. A display is produced on a pixel basis since the liquid crystal operates with the data voltages being written onto the liquid crystal layer 107 for each pixel 113. Accordingly, as described above, a two-dimensional image can be displayed in a fashion similar to the embodiment of the prior art shown in FIG. 1 and FIG. 2 by successively scanning the discharge channels 112 in which the plasma discharge is generated and writing the data voltages DS(1) to DS(m) onto the liquid crystal layer 107 for the various pixels 113 which are arrayed along the direction of the rows.

As described above, in this embodiment the data voltage DS is written with the AC discharge, and when the charge is completed the discharge does not continue. Thus, the discharge is not dispersed and a partial discharge is made less likely because of the drop in voltage. Accordingly, it is possible to obtain a uniform discharge current density throughout the entire area of the discharge channel 112 and to obtain a stable display image for the whole screen. Further, since the discharge is not continued, the loss of the screen contrast caused by the discharge luminescence can be reduced.

The present device is driven so that the polarity of the data voltage DS which is applied to the data electrode (row electrode) 105 becomes opposite to the polarity of the drive pulse which is applied to the column electrode 131 with respect to the reference voltage Vref applied to the reference electrode 135. When the polarity of the drive pulse which is applied to the row electrode 131 and the polarity of the data voltage DS which is applied to the data electrode 105 are inverted, the electric potential difference between the protection layers 133 and 134 becomes relatively large due to the stacking of the "wall voltage". Accordingly, the discharge is not controlled due to the influence of the data voltage DS, the voltage for the drive pulse in the states, other than the initial state, can be lowered, and the present device has the advantage of the ability to be driven by a lower drive pulse voltage.

Further, since a transparent dielectric layer 132 is constructed to cover the row electrodes 131, sputtering at the row electrodes 131 caused by the ions and the electrons generated by the plasma discharge is less likely to occur, allowing control over disconnections of the row electrode 131. In addition, it is possible to prevent transmittance from being reduced, since the metal forming the row electrodes 131 is not scattered even if sputtering occurs.

Moreover, since the protection layers 133 and 134 are added to the discharge channel 112 side of the dielectric sheet 103 and the dielectric layer 132, it is possible to control rises in discharge generating voltage due to deterioration of the dielectric sheet 103 and the dielectric layer 132 over time from plasma discharges and is also possible to lower the discharge generating voltage, both of which are advantages to the present invention.

In addition, although the protection layers 133 and 134 are constructed over the entire discharge channel 112 side of the dielectric sheet 103 and the dielectric layer 132 in the embodiment described above, these protection layers 133 and 134 are constructed so as to control rises of the discharge generating voltages due to deterioration of the dielectric sheet over time from plasma discharges, and so as to lower the discharge generating voltage, therefore it would also be sufficient to construct such protection layers only over those areas where the plasma discharge is generated. For example, for the upper side of the dielectric layer 132, the area which corresponds to row electrodes 131 is virtually the only place where a plasma discharge is generated.

Although the transparent dielectric layer 132 is constructed to cover the row electrode 131 located above the underside of the substrate 108 in this embodiment, the dielectric layer 132 is not always needed because the activity of the plasma discharge (AC discharge) is generated by the mere presence of the dielectric sheet 103. Similarly, the protection layers 133 and 134 which are constructed on the discharge channel 112 side of both the dielectric sheet 103 and the dielectric layer 132 in this embodiment, are not always needed.

Figure 13:
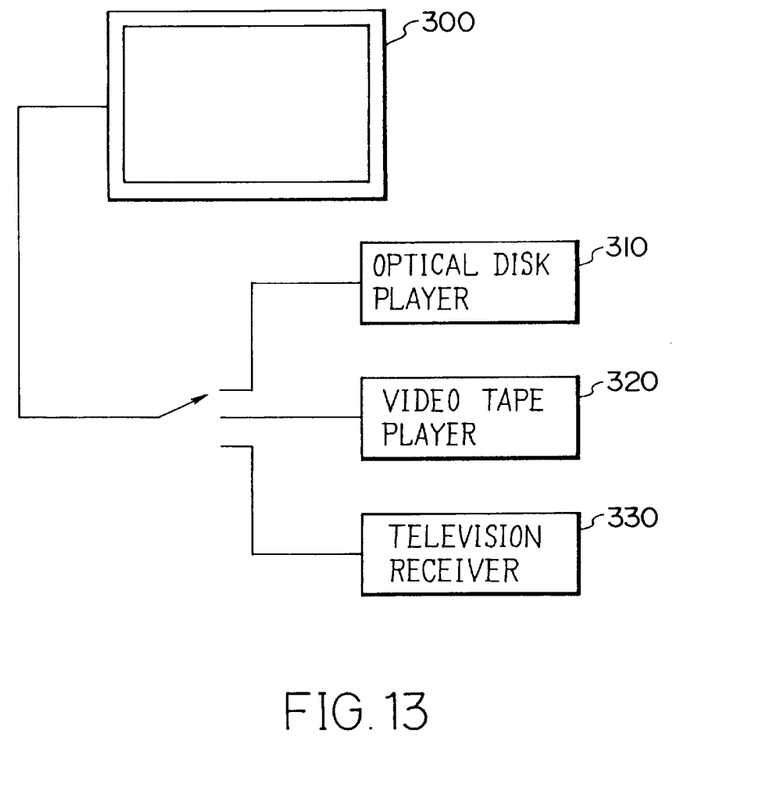
FIG. 13 illustrates a further embodiment of the present invention.

Another embodiment of the present invention is shown in FIG. 13 and incorporates a video source such as, for example, a television receiver 330, optical disk player 310 or video tape player 320 or the like. The video source generates a video signal to drive the plasma addressed display panel 300 so as to cause image information represented by the video signal to be displayed on the plasma addressed display panel 300. It will be appreciated by those skilled in the art that this embodiment may be constructed so that all or substantially all components are enclosed within a single housing(enclosure) or are maintained as a plurality of independently housed components.

Figure 14:
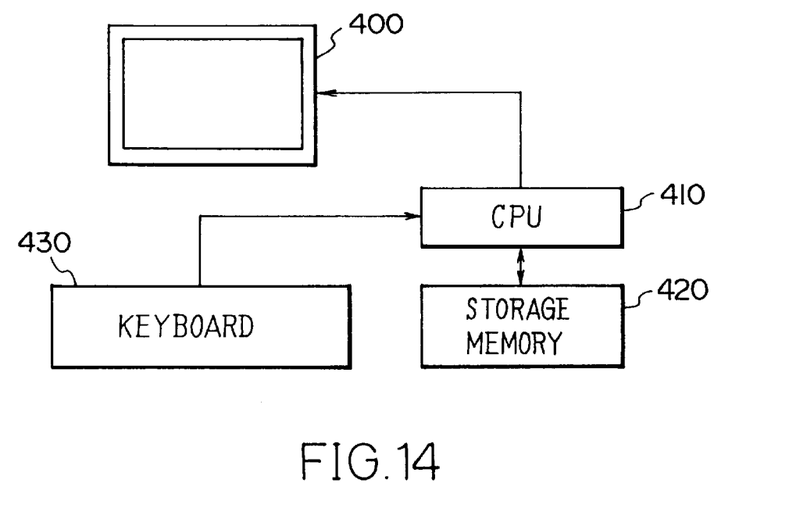
FIG. 14 illustrates another embodiment of the present invention.

Another embodiment of the present invention is shown in FIG. 14. This embodiment incorporates a user input device, such as a key board/key pad 430 or the like, a central processing unit (CPU) 410 for processing and controlling the flow of data input via the user input device and outputting a processed signal, a storage memory 420 for storing data and processing circuitry to generate a display output signal in accordance with the processed signal from the central processing unit. The display output signal is utilized to drive the plasma addressed display panel 400 to display image data represented by the display output signal.

In view of the above description of the present invention, it will be appreciated by those skilled in the art that many variations modifications and changes can be made to the present invention without departing from the spirit or scope of the present invention as defined by the appended claims hereto. All such variations, modifications or changes are fully contemplated by the present invention.

What is claimed is:

1. A plasma addressed display device, comprising:
   a display cell comprising an electro-optical material layer, and a plurality of non-overlapping first electrodes positioned parallel to each other in a horizontal direction on one side of said electro-optical material layer;
   a plasma cell provided on the other side of said electro-optical material layer from said first electrodes and having a plurality of non-overlapping discharge channels, each of said discharge channels including a reference electrode and a second electrode and positioned parallel to each other in a vertical direction;
   a dielectric sheet provided between said display cell and said plasma cell;
   a driving circuit for applying a data voltage to said first electrodes; and
   plasma discharge generating means for generating a plasma discharge between said first and second electrodes to apply said data voltages to said electro-optical material layer through said dielectric sheet.

2. The plasma addressed display device in accordance with claim 1, wherein said plasma discharge generating means comprises:
   drive pulse applying means for applying drive pulses to said second electrodes.

3. The plasma addressed display device in accordance with claim 2, wherein polarities of said data voltages applied to said first electrodes are opposite to polarities of said drive pulses applied to said second electrodes with respect to an electric potential of said reference electrodes.

4. The plasma addressed display device in accordance with claim 1, wherein a protection layer is formed, covering a surface of said dielectric sheet on a side toward said discharge channels at least in places where said plasma discharge is generated.

5. The plasma addressed display device in accordance with claim 1, wherein a protection layer is formed on said dielectric sheet extending across a whole area between said dielectric sheet and said plasma cell.

6. The plasma addressed display device in accordance with claim 1, wherein a dielectric material layer is formed covering surfaces of said second electrodes.

7. The plasma addressed display device in accordance with claim 6, wherein a protection layer is formed, covering a surface of said dielectric material layer on said discharge channel side at least in places where said plasma discharge is generated.

8. The plasma addressed display device in accordance with claim 1, wherein said electro-optical material layer is a liquid crystal layer.

9. The plasma addressed display device in accordance with claim 1, wherein said discharge channels are separated by barrier ribs which are formed between two neighboring reference electrodes.

10. The plasma addressed display device in accordance with claim 5, wherein said discharge channels are separated by barrier ribs which are formed between two neighboring reference electrodes.

11. The plasma addressed display device in accordance with claim 10, wherein tops of said barrier ribs are constructed in contact with an underside of said first protection layer.

12. The plasma addressed display device in accordance with claim 1, wherein said reference electrodes extend along said discharge channels so as not to lie on said second electrodes.

13. A plasma addressed display device, comprising:
a display cell comprising an electro-optical layer having a first surface and a second surface;
a plurality of non-overlapping first electrodes positioned on said first surface of said electro-optical layer so as to be substantially parallel to one another;
a dielectric sheet layered on said second surface of said electro-optical layer;
a plasma cell coupled to said dielectric sheet comprising a plurality of non-overlapping discharge channels; said discharge channels each comprise a reference electrode and a second electrode arranged so as to be substantially parallel to each other;
a protective layer on said second electrode of each of said discharge channels to cover said second electrodes, said reference electrode being exposed in said discharge channels;
a driving circuit for applying a predetermined voltage to said first electrodes of said display cell; and
plasma discharge generator for generating a plasma discharge between said first electrode and said second electrodes of said plasma cell so as to produce and apply said predetermined voltage to said electro-optical layer via said dielectric sheet.

14. A plasma addressed display device, comprising:
a display cell;
a plasma cell coupled to said display cell;
said display cell comprises:
  a first substrate;
  a plurality of data electrodes formed on said first substrate so as to be substantially parallel to each other;
  a dielectric sheet separated from said first substrate by a predetermined distance by spacers, so as to form an interior space between said first substrate and said dielectric sheet; said spacers are formed substantially along the outer perimeter of said dielectric sheet; said space between said dielectric sheet and said first substrate being filled with a liquid crystal material;
said plasma cell further comprises
  a second substrate;
  a plurality of column electrodes formed in said second substrate so as to be substantially parallel to each other;
  transparent dielectric layer formed on said second substrate so as to cover said plurality of column electrodes;
  first transparent protection layer formed on said transparent dielectric layer;
  a plurality of substantially parallel barrier ribs formed on said first transparent protection layer so as to be substantially perpendicular to said data electrodes of said display cell;
  second transparent protection layer formed on said barrier ribs;
  said barrier ribs spacing said second transparent protection layer from said first transparent protection layer by a predetermined distance so as to form a space therebetween;
  a plurality of substantially parallel reference electrodes formed on said first transparent protection layer; said reference electrodes and said barrier ribs are alternately aligned on said first transparent protection layer so that one reference electrode is located between two of said barrier ribs; said space formed between said first and second transparent protection layers being filled with an ionizable gas; and
a driving circuit for controlling application of predetermined voltages, having predetermined polarities, to said data electrodes, row electrodes and reference electrodes at appropriate times.

15. A plasma addressed display device according to claim 14 wherein said dielectric sheet of said display cell is comprised of $SiO_2$.

16. A plasma addressed display device according to claim 14 wherein said space between said dielectric sheet of said display cell and said first substrate is approximately 4 $\mu$m–10 $\mu$m.

17. A plasma addressed display device according to claim 14 wherein said transparent dielectric layer is comprised of $SiO_2$.

18. A plasma addressed display device according to claim 14 wherein said first and second transparent protection layers of said plasma cell comprise MgO.

19. A plasma addressed display device according to claim 14 wherein said ionizable gas is selected from the group consisting of helium, neon and argon.

20. A plasma addressed display device, comprising:
a video signal source;
plasma addressed display device for displaying graphic or video imagery;
processing circuitry for controlling said plasma addressed display device so as to cause imagery to be displayed on said display device in accordance with a video signal from said video signal source;
said plasma addressed display device comprises a display cell and a plasma cell coupled to said display cell;
said display cell comprises:
  a first substrate;
  a plurality of data electrodes formed on said first substrate so as to be substantially parallel to each other;
  dielectric sheet separated from said first substrate by a predetermined distance by spacers, so as to form an interior space between said first substrate and said dielectric sheet; said spacers are formed substantially along the outer perimeter of said dielectric sheet; said space between said dielectric sheet and said first substrate is filled with a liquid crystal material;
said plasma cell further comprises
  a second substrate;
  a plurality of row electrodes formed in said second substrate so as to be substantially parallel to each other;
  transparent dielectric layer formed on said second substrate so as to cover said plurality of row electrodes;
  a first transparent protection layer formed on said dielectric layer;
  a plurality of substantially parallel barrier ribs formed on said first transparent protection layer so as to be substantially perpendicular to said data electrodes of said display cell;
  a second transparent protection layer formed on said barrier ribs; said barrier ribs act to space said second transparent protection layer from said first transparent protection layer by a predetermined distance so as to form a space therebetween;

a plurality of substantially parallel reference electrodes formed on said first transparent protection layer; said reference electrodes and said barrier ribs are alternately aligned on said first transparent protection layer so that one reference electrode is located between two of said barrier ribs; said space formed between said first and second transparent protection layers is filled with an ionizable gas; and a driving circuit for controlling the application of predetermined voltages, having predetermined polarities, to said data electrodes, row electrodes and reference electrodes at appropriate times.

21. A plasma addressed display device, comprising:

a user input device;

a central processing unit;

memory storage device;

display device comprising a display cell and a plasma cell coupled to said display cell;

said display cell comprises:
  a first substrate;
  a plurality of data electrodes formed on said first substrate so as to be substantially parallel to each other;
  dielectric sheet separated from said first substrate by a predetermined distance by spacers, so as to form an interior space between said first substrate and said dielectric sheet; said spacers are formed substantially along the outer perimeter of said dielectric sheet; said space between said dielectric sheet and said first substrate is filled with a liquid crystal material;

said plasma cell further comprises
  second substrate;
  a plurality of row electrodes formed in said second substrate so as to be substantially parallel to each other;
  transparent dielectric layer formed on said second substrate so as to cover said plurality of row electrodes;
  first transparent protection layer formed on said transparent dielectric layer;
  a plurality of substantially parallel barrier ribs formed on said first transparent protection layer so as to be substantially perpendicular to said data electrodes of said display cell;
  a second transparent protection layer formed on said barrier ribs; said barrier ribs act to space said second transparent protection layer from said first transparent protection layer by a predetermined distance so as to form a space therebetween;
  a plurality of substantially parallel reference electrodes formed on said first transparent protection layer; said reference electrodes and said barrier ribs are alternately aligned on said first transparent protection layer so that one reference electrode is located between two of said barrier ribs; said space formed between said first and second transparent protection layers is filled with an ionizable gas; and a driving circuit for controlling the application of predetermined voltages, having predetermined polarities, to said data electrodes, row electrodes and reference electrodes at appropriate times.

* * * * *